(No Model.)

J. KRESS.
HORSESHOE.

No. 361,635.  Patented Apr. 19, 1887.

WITNESSES:
D. Petri-Palmedo
Carl Karp

INVENTOR
John Kress
BY
Jocques Raegener
ATTORNEYS

UNITED STATES PATENT OFFICE.

JOHN KRESS, OF NEW YORK, N. Y., ASSIGNOR OF ONE-HALF TO HENRY M. HAAR, OF SAME PLACE.

HORSESHOE.

SPECIFICATION forming part of Letters Patent No. 361,635, dated April 19, 1887.

Application filed November 17, 1886. Serial No. 219,115. (No model.)

*To all whom it may concern:*

Be it known that I, JOHN KRESS, of the city, county, and State of New York, have invented certain new and useful Improvements in Horseshoes, of which the following is a specification.

This invention relates to horseshoes of that class which are attached to the hoof without nails, and which can be quickly applied and detached without requiring the special fitting of the shoe to the hoof; and the invention consists of a horseshoe which is composed of pivoted shoe-sections having bent upwardly-extending lugs, notched or serrated links pivoted to the rear ends of the rear sections, a yoke or bail attached to one of the links, and a clamping-screw passing through said yoke or bail and serving to lock said links together.

Figure 1:
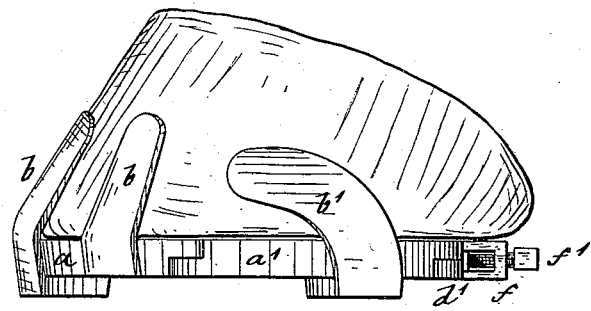
Figure 2:
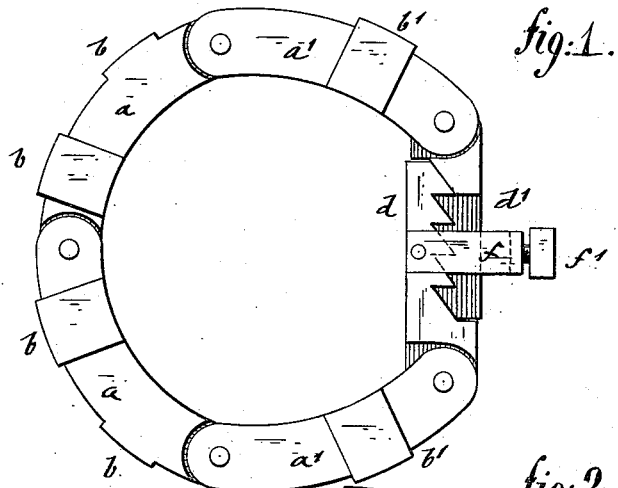

In the accompanying drawings, Figure 1 represents a side elevation of my improved horseshoe shown as applied to the hoof. Fig. 2 is a bottom view of the shoe in closed position, and Fig. 3 a top view of the same shown in open position and detached from the hoof.

Similar letters of reference indicate corresponding parts.

Figure 3:
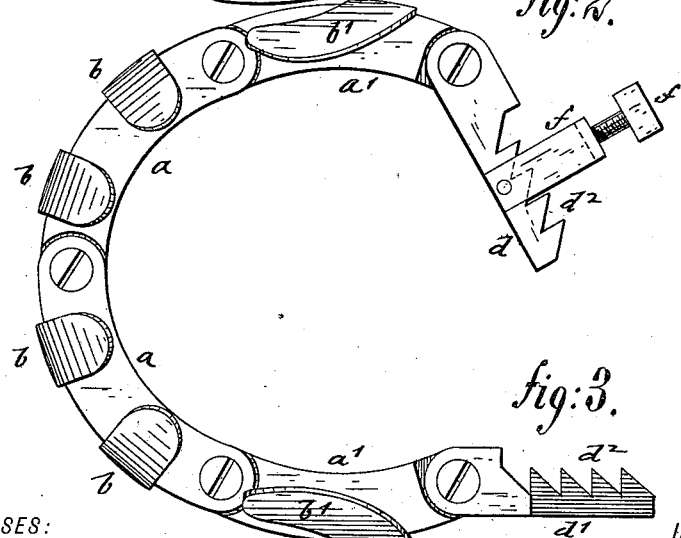

My improved horseshoe is composed of four or more sections, $a$ $a'$, which are pivoted together, each section conforming to a portion of the circumference of the base of the hoof. The front sections, $a$ $a$, are provided with bent upwardly-extending lugs, $b$ $b$, that are arranged at such an inclination to the sections $a$ $a$ as required by the shape of the body of the hoof. The rear sections, $a'$ $a'$, are provided with one lug, $b'$, each, that is bent in forward direction and slightly inclined, as shown in Figs. 1 and 3. Each section is provided with a calk, the shoes which are used in winter having pointed calks, while those used in summer have blunt calks. For racing-horses shoes without calks are used. To the rear ends of the rear sections, $a'$ $a'$, are pivoted locking-links $d$ $d'$, which are provided at their adjoining sides with teeth or serrations $d^2$, that fit one into the other, so that the intimate interlocking of the links is produced. The link $d$ is provided with a fixed yoke or bail, $f$, having a clamping-screw, $f'$, by which latter the second link, $d'$, is firmly held in interlocked position with the link $d$ by the screw $f'$, as shown in Fig. 2. When the shoe is to be detached, the screw $f'$ is loosened and the links $d$ $d'$ separated from each other, as shown in Fig. 3.

When the shoe is clamped to the hoof in the manner described, it is firmly retained thereon without nails or other fastening devices, so that the hoof is not injured by the latter.

The shoe can be applied or detached without difficulty and readily fitted to any shape of hoof, owing to the facility by which the pivoted shoe-sections adapt themselves to the contour of the hoof.

I am aware that horseshoes have been made of pivoted sections which are clamped to the hoof by means of locking devices connecting the rear edges of the shoe-sections, and I therefore do not claim this feature, broadly.

Having thus described my invention, I claim as new and desire to secure by Letters Patent—

The combination of pivoted shoe-sections having bent upwardly-extending lugs, notched or serrated links pivoted to the rear ends of the rear sections, a yoke or bail attached to one of the links, and a clamp-screw passing through said yoke or bail and locking said links together, substantially as set forth.

In testimony that I claim the foregoing as my invention I have signed my name in presence of two subscribing witnesses.

JOHN KRESS.

Witnesses:
MARTIN PETRY,
CARL KARP.